Feb. 6, 1945.    S. BIZJAK    2,368,630
ELECTRICALLY POWERED GLIDER
Filed June 3, 1943

Inventor
STANLEY BIZJAK
By
Attorney

Patented Feb. 6, 1945

2,368,630

UNITED STATES PATENT OFFICE 2,368,630

ELECTRICALLY POWERED GLIDER

Stanley Bizjak, Crivitz, Wis.

Application June 3, 1943, Serial No. 489,562

2 Claims. (Cl. 244—58)

This invention relates to an electrically powered glider partially supported by buoyant gas.

Among the more important objects of the invention are to provide an electrically powered glider, partially supported by buoyant gas, which can take off silently and operate under its own power during flight and one which during aerial maneuvering can have its motive power manually disconnected so as to utilize the glider's propeller which is always directly connected to a generator to automatically regenerate the power batteries independently of the electrical power to compensate for loss of electrical energy consumed in rising into the air or else for power expended in flight in performing various aerial maneuvers which the electric motor per se is incapable of producing.

At the present time there is no silent electric operated power glider, which can, upon release from a towed formation, be quickly maneuvered to a desired destination and then take off quickly and quietly once the pilot's mission is satisfactorily performed. A power glider of the character above mentioned is highly desirous for use in carrying messages and alighting and taking off back of enemy lines in destroying enemy communications. Also high in the agenda of objects is to provide a glider especially adapted for combat service in transporting commando troops in performing raids, dropping parachutists, and picking up and transporting wounded and captive prisoners.

More important objects of the invention constitute the provision of such an improved power glider as will meet the aforesaid requirements more simply and economically.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Figure 1:
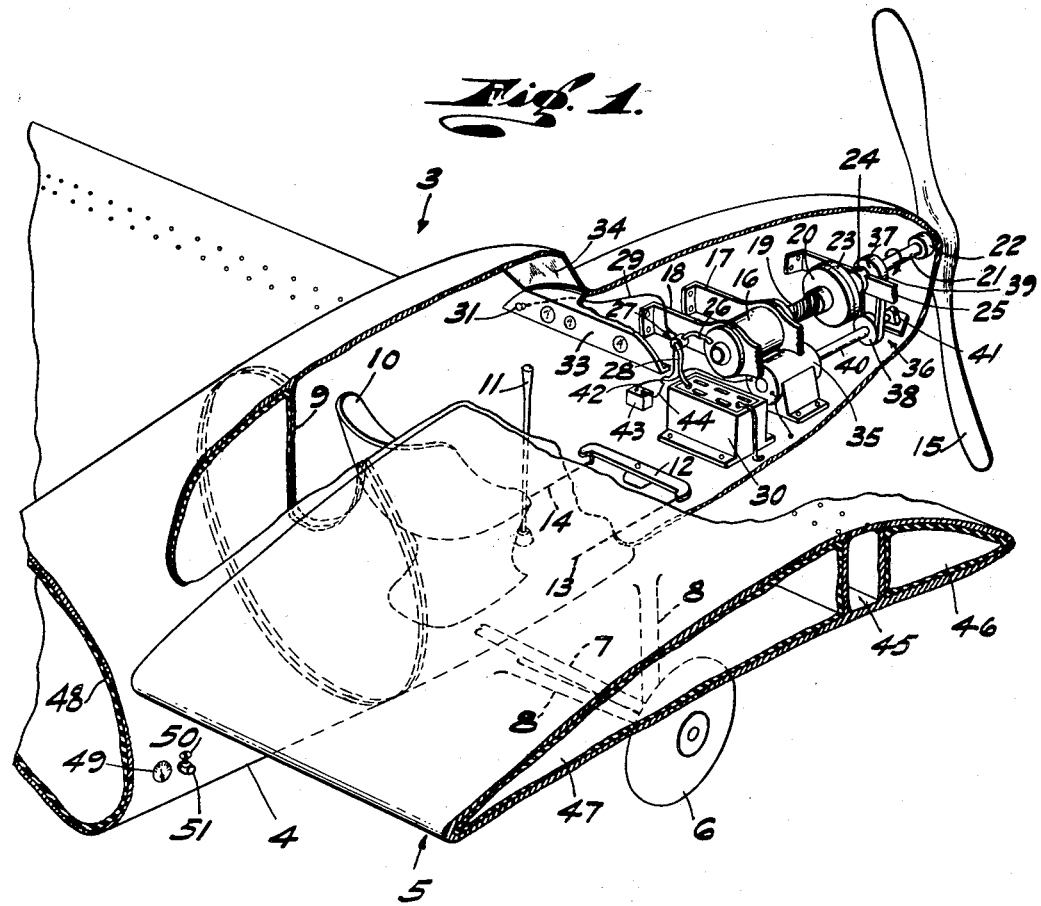

Referring to the drawing, wherein is shown a preferred embodiment of the invention, Fig. 1 is a fragmentary perspective view of the powered end of a glider, some portions of which are broken away to disclose the operating and electrical power propulsion mechanism, and other portions being removed to contract the view.

Figure 2:
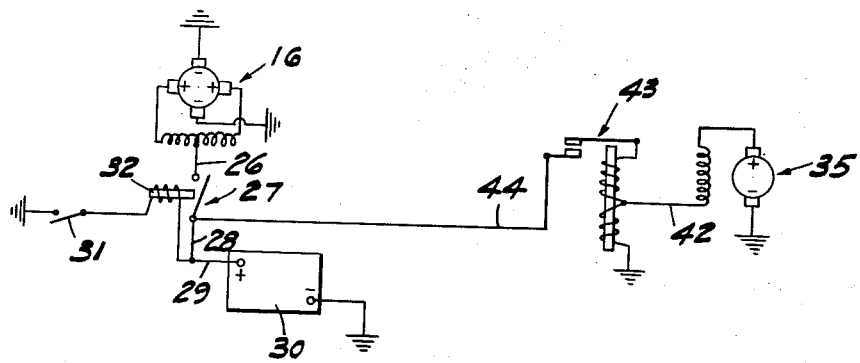

Fig. 2 is a wiring diagram of the electrical apparatus.

Referring in detail to the drawing, therein is shown a power glider 3 comprising the fuselage 4, wing structure 5 and wheels 6, one of which is shown, mounted on the fragment of the axle 7 and fastened to the wing structure 5 by means of landing gear struts 8.

In the forward compartment of the fuselage, directly in front of the bulkhead 9, is the operator's seat 10 which is so positioned as to place the pilot within convenient manual reach of the control stick 11, and rudder bar 12 whereby the rudder is controlled by means of the cables 13 and 14.

Farther in front of the pilot's seat 10 is the electrical power propulsion mechanism or power unit which actuates the propeller 15 enabling the glider to rise from the ground and into the air under its own power. Said power unit comprises a starting motor 16, mounted upon the side walls of the fuselage by means of the transversely extending supports 17, 18 and includes a motor shaft having a screwthreaded engaging portion 19 upon which is mounted in a bodily movable manner a clutch plate 20.

The propeller 15 is mounted upon the free end of the protruding propeller shaft 21, the forward part of said shaft being journalled in the bearing 22. The opposite end of the shaft 21 has rotatably stationed upon it a second clutch plate 23 to cooperate with the clutch plate 20, and intermediate said plate 23 and bearing 22 said shaft 21 is supported in a bearing 24 carried by the transverse beam 25.

The motor 16 is connected by means of a conductor wire 26 to a magnetically controlled switch 27, and said switch 27 is connected to a conductor wire 28 which in turn is connected to a conductor wire 29 leading from the storage battery 30 to a starter switch 31. Conductor wire 29 is shown wound around a magnet 32, see Fig. 2, which when the starter switch 31 is closed actuates magnetically controlled switch 27 to cause current to flow from the storage battery to the starting motor. Starter switch 31 is located on the instrument panel 33 and just forward of the instrument panel is the windshield 34 of the glider.

The number of plates of the battery depends on the size of the glider and load requirement, there being provision made to compensate for the added weight of the battery through the use of helium gas stored in rubber bags and located in the wings and fuselage as will be more fully hereinafter set forth.

In order to regenerate the storage battery 30 whenever the glider is in motion, through the medium of the propeller 15, once the motor is stopped, which regenerating operation may be continued indefinitely in flight, I employ a generator 35, which is operatively connected to the propeller shaft 21 through the medium of the V-belt generator drive 36. The drive 36 specifically includes the pulleys 37 and 38, and belt 39. Pulley 37 is mounted on the propeller shaft 21 while the pulley 38 is mounted on the generator shaft 40, one end of the latter shaft being journalled in the bearing 41.

The generator 35 is connected by a conductor wire 42 to a reverse current cutout 43 and a conductor wire 44 connects the latter cutout to the battery 30 through the medium of conductor wires 28 and 29. The reverse current cutout is for automatically connecting the generator 35 to the battery 30 while charging and for automatically disconnecting the battery when not charging, thereby preventing the battery from discharging through the generator windings. This type of reverse current cutout is standard equipment on all makes of automobiles now being sold.

The fuselage 4 and wing structure 5 are constructed of sheet metal shapes contoured to give strength and rigidity to the glider as a whole, the wing structure 5 being reinforced by riveting or otherwise securing the beam 45 thereto, the holds on either side of said beam being utilized for the storage of gas bags 46 and 47 for containing helium gas to compensate for the additional weight of the battery or batteries aforementioned. Also the portion of the fuselage rearwardly of the bulkhead 9 is utilized for the storage of a rubber gas bag 48 for containing helium gas for the purpose aforesaid. Each bag is supplied with a pressure gage 49 and a valve 50 for filling or emptying the bag, the valve 50 being equipped with an inlet nozzle 51 to which to attach the gas hose.

From the foregoing it will be obvious I have provided an electrical power drive for take-off and during flight, and that I automatically recharge the battery at will after once shutting of the starter switch through the idling of the propeller which is direct connected to the propeller shaft and which operates the generator through the medium of the V-pulley direct connected drive, the reverse current cutout working automatically to discontinue recharging once the battery is built up.

The operation is believed to be evident from the foregoing description but a brief summary will be given in order to elaborate upon some of the details whose functions were purposely omitted in the detailed description, reference being had more particularly now to the wiring diagram shown in Fig. 2.

Closing starter switch 31 energizes magnet 32 to close switch 27 thereby energizing motor to start rotating by power furnished from the storage battery 30. Clutch plate 20 is forced to grab front clutch plate 23 when the motor starts because the inertia of the plate 20 keeps it from rotating at first so it screws up to the forward plate as the motor shaft starts rotating. It stays in this position to drive the propeller 15. When the current is turned off the propeller, due to the forward motion of the glider, keeps turning in the direction of the arrow and therefore since the motor is now stopped (due to the friction of its brushes with the commutator) the rear clutch plate screws back away from the front clutch plate.

While the propeller is idling during flight the generator 35 is operated to recharge the battery independently of the electric motor to compensate for any loss of power in taking off or maneuvering during flight which the electric motor is incapable of replenishing by means of the V-pulley drive 36, direct connected to the shaft 21 on which the propeller is mounted and also connected to the shaft 40. When the storage battery is fully charged or when the generator is not charging, the reverse current cutout automatically disconnects the generator to prevent the battery from discharging through the generator windings.

What is claimed is:

1. In an electrically powered glider, a propeller including a shaft, an electric motor including an armature shaft having a screw-threaded engaging portion in axial contiguity with said propeller shaft, a clutch comprising axially fixed and axially movable elements respectively mounted upon the contiguous ends of the propeller and armature shafts for operatively connecting and disconnecting said shafts, a generator including a driving shaft, an electrical circuit including said generator and electric motor; said circuit containing a battery, a magnetic switch between said motor and battery, and a manually operable switch actuable to close said magnetic switch to complete the circuit between said motor and battery, and means to complete the circuit between said generator and battery; and driving means operatively connecting said propeller shaft and said generator shaft.

2. The combination in a glider including a fuselage, a propeller including a shaft, an electric motor including an armature shaft having a screwthreaded engaging portion, means mounting said electric motor and propeller upon said fuselage whereby the ends of said propeller shaft and screwthreaded portion of said armature shaft are brought into contiguity and axial alinement, means comprising axially fixed and axially movable elements mounted respectively upon the contiguous ends of said propeller shaft and the screwthreaded engaging portion of said armature shaft, a generator including a shaft, driving means operatively connecting said generator shaft and said propeller shaft to operate said generator independently of said electric motor while the latter is idle, an electrical circuit including said generator and electric motor, said circuit including a battery and a magnetically controlled switch for closing the circuit between said motor and battery, and a manually operable switch in said circuit which upon closing actuates said magnetically controlled switch to energize said motor through the medium of said battery and to advance said axially movable element into a clutching relation with said axially fixed element.

STANLEY BIZJAK.